Aug. 4, 1959  L. T. ULFSTEDT ET AL  2,898,220
PROCESS FOR MANUFACTURING STEAM-CURED LIGHT-WEIGHT
CONCRETE WITH LOW SHRINKAGE
Filed Nov. 25, 1952
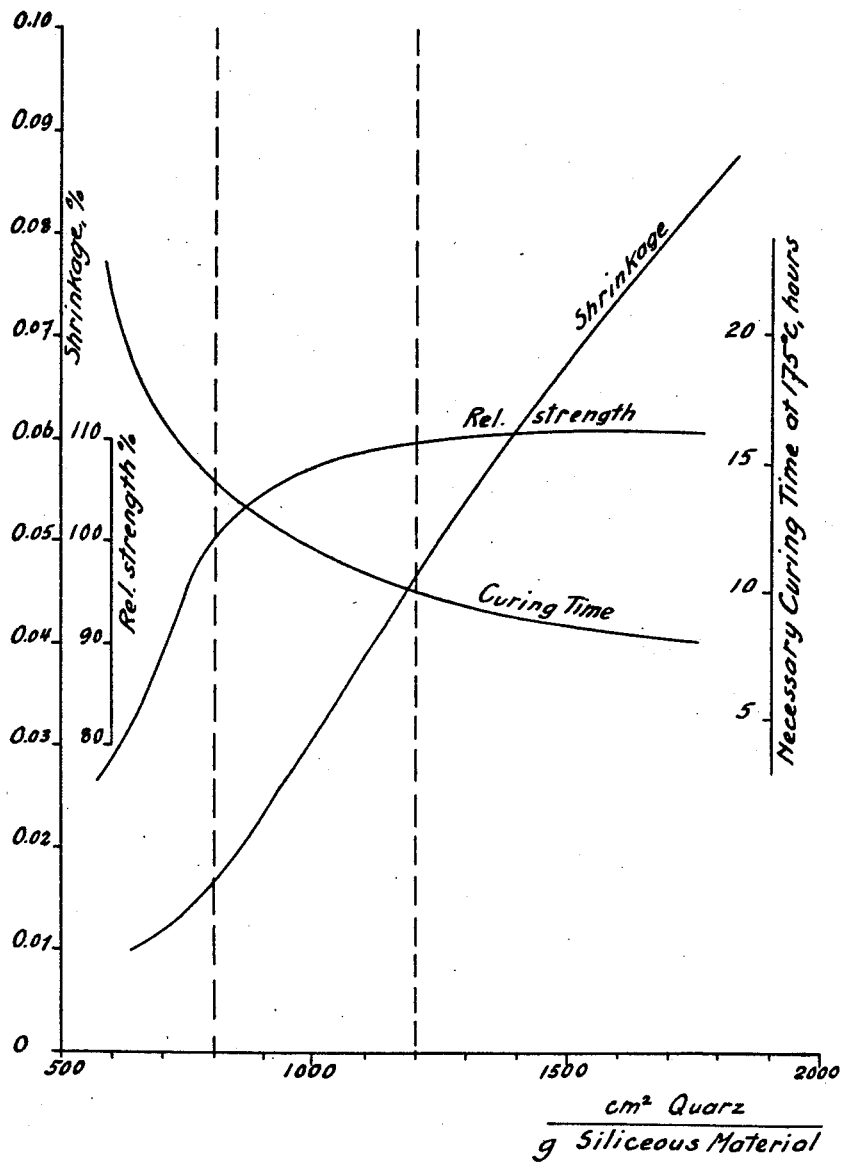
INVENTORS,
LEO TORSTEN ULFSTEDT,
BENGT FREDRIK JONNY BENGTSSON
By Henry C. Parker
Atty.

2,898,220

PROCESS FOR MANUFACTURING STEAM-CURED LIGHT-WEIGHT CONCRETE WITH LOW SHRINKAGE

Leo Torsten Ulfstedt and Bengt Fredrik Jonny Bengtsson, Sodertalje, Sweden, assignors, by mesne assignments, to Casius Corporation Limited, Montreal, Quebec, Canada Application November 25, 1952, Serial No. 322,457

1 Claim. (Cl. 106—87)

This invention concerns the manufacture of porous light-weight concrete from a raw material mixture mainly comprising binders rich in lime, quartz-containing aggregate, water and a gas or foam-developing agent, which concrete after setting is subjected to a steam-curing, e.g. a thermal treatment at temperatures exceeding 120° C., in the presence of water.

As is well known, such light-weight concrete shrinks comparatively slightly in comparison with such concrete which has not been subjected to a steam-curing. With "shrinkage" in this connection is to be understood the decrease or reduction in dimensions occurring when the material after having been completely saturated with water, is dried down to a moisture-content corresponding to the moisture-content of the material when in equilibrium with air having a content of relative moisture of 45%. However, not even the comparatively low shrinkage of the steam-cured products is always sufficient. For the stability of building constructions made of light-weight concrete, and to prevent the formation of cracks in the concrete obviously a very low shrinkage is particularly desirable. In addition, only when using a light-weight concrete whose moisture-conditioned movements are very small, is it possible to manufacture a satisfactory reinforced material, which neither during the manufacturing process, where its content of water is exposed to great variations, nor in the finished construction, has the tendency of forming cracks, or bending.

According to the invention it is possible to manufacture such light-weight concrete with slight shrinking tendency. Surprisingly, it has been found that the shrinkage is practically independent of the nature and fineness of the lime-containing binder and also of the nature of the quartz-containing aggregate. Nor is there any direct relation between the shrinkage and the fineness of the quartz-containing aggregate per se; but a relation does exist between the shrinkage and the quantity of the quartz and its fineness, in so far as the shrinkage is a nearly linear function of the expression indicating the total surface of the quartz, based on unit weight of quartz-containing material.

In the experiments carried out by the inventors the specific surface of the tested quartz-powders has been determined according to the air-permeability method according to Blaine, and the testing has been carried out principally in the manner described in A.S.T.M. Designation: C204–46T (issued 1946).

The disclosed relation between the surface of the quartz and the shrinkage is illustrated in the drawing. Since the shrinkage for the reasons indicated above, from manufacturing and building point of view, should not exceed 0.04–0.05%, it will be seen from the diagram that the total surface of the quartz should not exceed 1200 cm.² per gram, quartz-containing or siliceous material.

By varying the surface of the quartz it has further been found that it has also an influence on the relative strength of the finished product which decreases with decreasing quartz surface. Especially pronounced is the decrease in strength when the surface of the quartz decreases below about 800 cm.². Further it has been found that there is a certain relation between the surface of the quartz and the time required for steam-curing of the product, if optimal strength properties are to be obtained. In case of a small quartz surface, longer curing times are required, and also this fact is especially pronounced when the total surface of the quartz decreases below 800 cm.² per gram quartz-containing material. Also the two last-mentioned functions are shown in the drawing.

In view of the foregoing, from manufacturing and building point of view, according to the invention the total surface of the quartz should not be lower than 800 cm.² per gram quartz-containing material.

In order to further illustrate the application of the process in practice some examples of the composition of light-weight concrete raw material mixtures according to the invention are mentioned below. In said examples only the quantities of the lime-containing binders and the quartz-containing aggregate are stated, since the amount of water to be added is dependent on the manner in which the introduction of gas into the mass is to take place, e.g. if gas-producing substances, such as pulverized metals (especially aluminium), hydrogen peroxide, carbides, hydrides are to be added to the mixture, or if a foam is to be produced in the mass by addition of special foam-forming agents, such as saponins, fatty acid sulphonates, petroleum sulphonates, resin soaps etc.

Example 1

A gas producing agent, water and 25% Portland cement were mixed with 75% ground granite containing 44.5% quartz. The granite had been ground down to a specific surface of between about 1800 and about 2700 cm.²/g., which corresponds to a total quartz surface of between about 800 and about 1200 cm.² in each gram of granite powder.

Example 2

A gas producing agent, water, 20% Portland cement and 10% lime were mixed with 70% sand which contained 72% quartz and ground down to a fineness corresponding to the specific surface of 1400 cm.²/g. Consequently, in this case the surface of the quartz component was about 1000 cm.²/g. ground sand.

Example 3

A gas producing agent, water, and 22% ground, unslaked lime were mixed with 78% of a quartz-containing mixture, consisting of 30% quartz-dust containing 80% quartz and having a specific surface of 4000 cm.²/g., and 70% of fly-ash which was free from quartz. The surface of the quartz component in the mixture consequently was between 900 and 1000 cm.² per gram of the mixture of quartz dust and fly-ash.

Example 4

A gas producing agent, water, 10% lime, 10% Portland cement and 15% ground blast-furnace slag were mixed with 65% of a mixture consisting of 30% of fine natural sand (A) containing 90% quartz and having a specific surface of 300 cm.²/g., and 70% of ground sand (B), likewise containing 90% quartz but having a specific surface of 1600 cm.²/g. The total surface of the quartz was consequently approximately 1100 cm.² per gram of the mixture A+B.

While various embodiments of our invention have been hereinabove indicated, it will be understood that the invention of this application is not limited to the specific examples herein recited but that numerous modifications and variations thereof may be made without departing from the principles of our invention.

We claim:

A process for manufacturing porous light-weight concrete from a raw material mixture comprising mixing a mineral binder containing a large amount of lime, quartz-containing aggregate, water, and a gas producing agent, said mineral binder consisting of Portland cement of approximately 25%, and the quartz-containing aggregate being ground granite of approximately 75% and containing approximately 44.5% quartz, said ground granite having a surface area to unit weight ratio between 1800 to 2700 cm.$^2$/g. and producing a quartz surface area of about 800 to about 1200 cm.$^2$/g. for each gram of ground granite.

References Cited in the file of this patent

UNITED STATES PATENTS

| | | |
|---|---|---|
| 1,003,813 | Schumacher | Sept. 19, 1911 |
| 2,081,802 | Eklund | May 25, 1937 |
| 2,511,725 | Lobaugh | June 13, 1950 |